(12) United States Patent
McEnerney et al.

(10) Patent No.: US 8,875,510 B2
(45) Date of Patent: Nov. 4, 2014

(54) SOLAR RECEIVER

(75) Inventors: Bryan William McEnerney, Canoga Park, CA (US); Andrew J. Zillmer, Canoga Park, CA (US); Charles Thomas Kudija, Jr., Canoga Park, CA (US)

(73) Assignee: Aerojet Rocketdyne of DE, Inc., Canoga Park, CA (US)

( * ) Notice: Subject to any disclaimer, the term of this patent is extended or adjusted under 35 U.S.C. 154(b) by 266 days.

(21) Appl. No.: 13/472,905

(22) Filed: May 16, 2012

(65) Prior Publication Data

US 2014/0026569 A1    Jan. 30, 2014

(51) Int. Cl.
*F03G 6/00* (2006.01)
*F24J 2/34* (2006.01)
*F24J 2/07* (2006.01)

(52) U.S. Cl.
CPC ... *F03G 6/00* (2013.01); *F24J 2/34* (2013.01); *F24J 2/07* (2013.01); *Y02E 10/46* (2013.01)
USPC ......... 60/641.15; 126/617; 126/676; 126/679

(58) Field of Classification Search
CPC .................. F24J 2/06; F24J 2/07; F24J 2/34; Y02E 10/40; Y02E 10/44
USPC ............ 60/641.8, 641.15; 126/617, 619, 658, 126/663, 664, 676, 678, 679
See application file for complete search history.

(56) References Cited

U.S. PATENT DOCUMENTS

| | | | |
|---|---|---|---|
| 4,355,627 A | 10/1982 | Scarlata | |
| 4,394,859 A * | 7/1983 | Drost | 126/647 |
| 4,402,306 A * | 9/1983 | McElroy, Jr. | 126/619 |
| 4,405,010 A * | 9/1983 | Schwartz | 165/4 |
| 4,414,812 A * | 11/1983 | Parry | 60/641.14 |
| 2006/0174866 A1* | 8/2006 | Zhang | 126/651 |
| 2007/0021810 A1 | 1/2007 | Paulin | |
| 2009/0322089 A1* | 12/2009 | Mills et al. | 290/52 |
| 2010/0089391 A1 | 4/2010 | Addie et al. | |
| 2011/0165061 A1 | 7/2011 | Yang et al. | |

* cited by examiner

*Primary Examiner* — Hoang Nguyen
(74) *Attorney, Agent, or Firm* — Joel G Landau

(57) ABSTRACT

A solar receiver includes a cavity that is operable to receive concentrated solar energy and a heat exchanger in thermal-receiving communication with the cavity. The heat exchanger includes a plurality of thermal capacitors. Each of the plurality of thermal capacitors has a regular geometry. The plurality of thermal capacitors defines open flow passages there between and at least two of the plurality of thermal capacitors have a different size. The plurality of thermal capacitors has a packing factor of greater than 74% with regard to the volume of the heat exchanger.

20 Claims, 2 Drawing Sheets

SOLAR RECEIVER

STATEMENT REGARDING FEDERALLY SPONSORED RESEARCH OR DEVELOPMENT

This invention was made with government support under contract number DoD HR0011-07-C-0093 awarded by DARPA. The government has certain rights in the invention.

BACKGROUND

This disclosure relates to solar receivers for storing and releasing thermal energy.

Solar receivers are known and used in solar thermal propulsion devices to collect solar radiation. For instance, the thermal energy from the solar radiation is transmitted to a propellant that is used to produce thrust in the solar thermal propulsion device.

SUMMARY

A solar receiver according to an exemplary aspect of the disclosure includes a cavity operable to receive concentrated solar energy, a heat exchanger in thermal-receiving communication with the cavity, the heat exchanger including a plurality of thermal capacitors.

In a further non-limiting embodiment, each of the plurality of thermal capacitors has a regular geometry.

In a further non-limiting embodiment of any of the foregoing examples, the plurality of thermal capacitors define open flow passages there between.

In a further non-limiting embodiment of any of the foregoing examples, the plurality of thermal capacitors have a different size.

In a further non-limiting embodiment of any of the foregoing examples, the plurality of thermal capacitors have a packing factor of greater than 74% with regard to the volume of the heat exchanger.

In a further non-limiting embodiment of any of the foregoing examples, the plurality of thermal capacitors includes cylindrical elements.

In a further non-limiting embodiment of any of the foregoing examples, the plurality of thermal capacitors includes substantially spherical elements.

In a further non-limiting embodiment of any of the foregoing examples, the plurality of thermal capacitors includes first geometric thermal capacitor elements having a first size and second geometric thermal capacitor elements having a second, smaller size.

In a further non-limiting embodiment of any of the foregoing examples, the first geometric thermal capacitor elements are free of contact with each other and each of the second geometric thermal capacitor elements is in contact with at least one other one of the second geometric thermal capacitor elements.

In a further non-limiting embodiment of any of the foregoing examples, each of the second geometric thermal capacitor elements is in contact with at least two others of the first geometric thermal capacitor elements in a continuous network.

In a further non-limiting embodiment of any of the foregoing examples, the second geometric thermal capacitor elements are arranged in a plurality of linear rows.

In a further non-limiting embodiment of any of the foregoing examples, the plurality of linear rows are parallel.

In a further non-limiting embodiment of any of the foregoing examples, the first geometric thermal capacitor elements are arranged such that at least one of the first geometric thermal capacitor elements has six nearest neighboring ones of the first geometric thermal capacitor elements.

In a further non-limiting embodiment of any of the foregoing examples, the heat exchanger extends circumferentially around the cavity.

In a further non-limiting embodiment of any of the foregoing examples, the heat exchanger has an annular shape.

In a further non-limiting embodiment of any of the foregoing examples, plurality of thermal capacitors include a refractory material selected from the group consisting of ceramic material, graphite material and combinations thereof.

A solar receiver according to an exemplary aspect of the disclosure includes a cavity operable to receive concentrated solar energy and a heat exchanger in thermal-receiving communication with the cavity. The heat exchanger includes first geometric thermal capacitor elements and second geometric thermal capacitor elements defining flow passages there between. The first geometric thermal capacitor elements having a first size and the second geometric thermal capacitor elements having a second, different size.

In a further non-limiting embodiment of any of the foregoing examples, the first geometric thermal capacitor elements and the second geometric thermal capacitor elements include at least one of cylindrical elements and substantially spherical elements.

In a further non-limiting embodiment of any of the foregoing examples, the first geometric thermal capacitor elements are free of contact with each other and each of the second geometric thermal capacitor elements is in contact with multiple other ones of the second geometric thermal capacitor elements.

In a further non-limiting embodiment of any of the foregoing examples, each of the second geometric thermal capacitor elements is in contact with at least two of the first geometric thermal capacitor elements.

In a further non-limiting embodiment of any of the foregoing examples, the heat exchanger has an annular shape.

A solar thermal propulsion device according to an exemplary aspect of the disclosure includes a solar receiver having a cavity operable to receive concentrated solar energy and a heat exchanger in thermal-receiving communication with the cavity. The heat exchanger includes a plurality of thermal capacitors, wherein each of the plurality of thermal capacitors has a regular geometry. The plurality of thermal capacitors define open flow passages there between, at least two of the plurality of thermal capacitors having a different size. The plurality of thermal capacitors has a packing factor of greater than 74% with regard to the volume of the heat exchanger. A thrust nozzle is in flow-receiving communication with the flow passages.

In a further non-limiting embodiment of any of the foregoing examples, the heat exchanger has an annular shape.

In a further non-limiting embodiment of any of the foregoing examples, the plurality of thermal capacitors includes at least one of cylindrical elements and substantially spherical elements.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION OF THE PREFERRED EMBODIMENT

Figure 1:
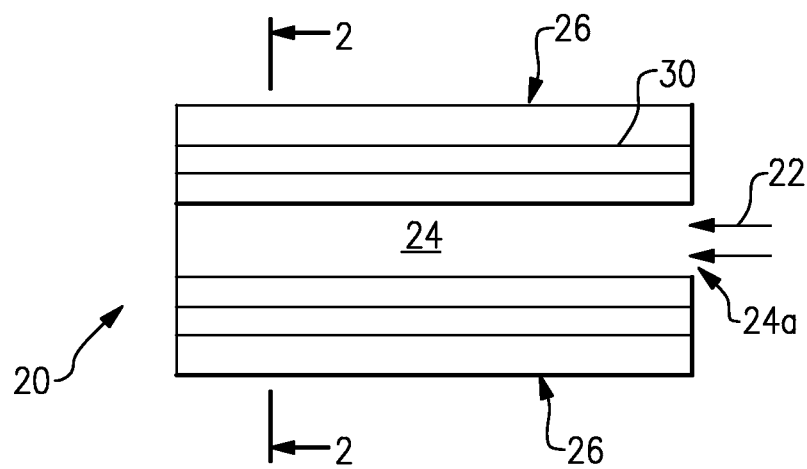
FIG. 1 shows a schematic view of a solar receiver.
Figure 2:
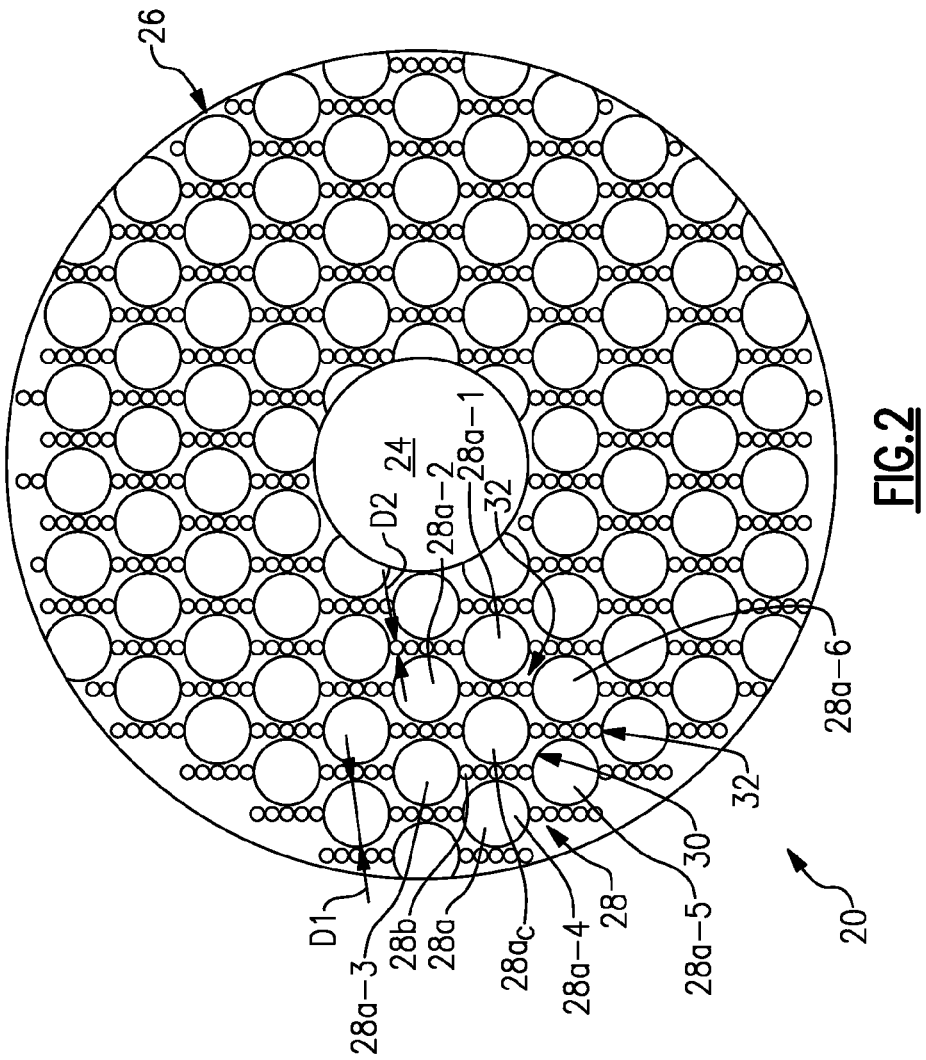
FIG. 2 shows a cross-section of the solar receiver of FIG. 1.

FIG. 1 shows a schematic illustration of selected portions of an example solar receiver 20 and FIG. 2 illustrates a cross-section of the solar receiver 20. As will be described, the solar receiver 20 is operable for receiving concentrated solar energy 22, such as from a heliostat or the like, and storing thermal energy from the concentrated solar energy 22 for thermal exchange to a working fluid. In thermal propulsion systems, such as in microsatellites, temperatures can exceed 4000° F./2204° F. and inefficient thermal management can result in high system mass and poor propulsion.

The solar receiver includes a cavity 24 that is operable to receive the concentrated solar energy 22. In this regard, the cavity 24 includes a solar-transmitting end 24a, such as an opening, a window or the like, through which the concentrated solar energy 22 is received.

The solar receiver 20 further includes a heat exchanger 26 arranged in thermal-receiving communication with the cavity 24. In this example, the heat exchanger 26 extends circumferentially around the cavity. The heat exchanger 26 includes a plurality of thermal capacitors 28, or elements, that each have a regular geometry and define open flow passages 30 there between. The capacitors 28 are arranged within the heat exchanger 26 with a packing factor of greater than 74% with regard to the volume of the heat exchanger occupied by the capacitors 28. Thus, the flow passages 30 occupy less than 26% of the volume.

The capacitors 28 include first geometric thermal capacitor elements 28a ("first elements") and second geometric thermal capacitor elements 28b ("second elements") that are smaller in size than the first elements 28a. The second elements 28b are arranged in the voids or interstices between the first elements 28a, which reduces the path that radiant thermal energy can travel. The size, shape and packing arrangement of the first elements 28a and the second elements 28b produce the packing factor of greater than 74%. Optionally, additional capacitors 28 that are different in size than the first elements 28a and the second elements 28b can additionally be used to adjust the packing factor. The size, shape and packing arrangement of the capacitors 28 can thus be tailored to meet thermal management design requirements for a given system.

Figure 4:
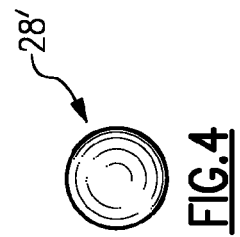
FIG. 4 shows a perspective view of a spherical geometric thermal capacitor element.
Figure 3:
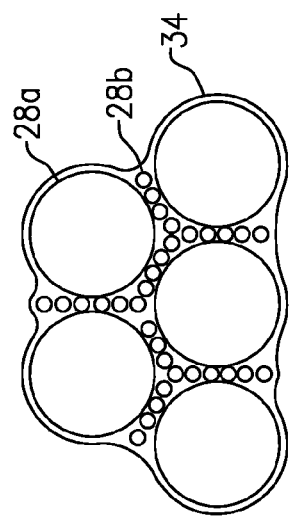
FIG. 3 shows a perspective view of a cylindrical geometric thermal capacitor element.

In one example, as shown in FIG. 3, the capacitors 28 are cylindrical elements. Therefore, the first elements 28a have a first size, diameter D1 (FIG. 2) and the second elements 28b have a second size, diameter D2, that is smaller than D1. The flow passages 30 are thus linear, parallel passages. In a modified example, as shown in FIG. 4, the capacitors 28', are substantially spherical elements. The flow passages 30 are thus non-linear, circuitous passages. It is to be understood, however, that the capacitors 28 can have other geometric shapes and are not limited to the illustrated examples. Additionally, cylindrical and spherical elements could be used together.

In the packing arrangement as shown in FIG. 2, the first elements 28a are free of contact with each other. The first elements 28a are arranged in a repeat pattern such that one of the first elements $28a_c$ has six nearest neighboring first elements 28a-1 through 28a-6 that are equidistant from the first element $28a_c$ (hexagonal packing). The first elements 28a can alternately have other packing arrangements to modify the packing factor, such as random or square packing. However, the hexagonal packing produces a relatively high packing factor.

Each of the second elements 28b is located between the first elements 28a and is in contact with one or more other ones of the second elements 28b. In this example, the second elements 28b are arranged in a plurality of linear rows 32. The linear rows 32 are parallel to each other. In a modified arrangement shown in FIG. 4, the second elements 28b form a continuous network between the first elements 28a.

Figure 5:
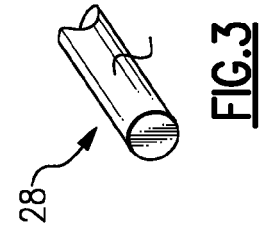
FIG. 5 shows a modified arrangement of geometric thermal capacitor elements.

The capacitors 28 are either loosely arranged within the heat exchanger 26 or are secured together. Securing the capacitors 28 together may facilitate assembly. For example, the elements may be lightly bonded together and/or bound together in units using a wire 34 (FIG. 5) or the like.

The capacitors 28 are or include a composition that has a relatively high thermal capacity. For example, the composition is a refractory material selected from ceramic material, graphite material and combinations thereof. In a further example, the elements are or include the ceramic material, and the ceramic material is selected from boron nitride, silicon nitride, silicon carbide, zirconium diboride and combinations thereof. Given this description, one of ordinary skill in the art will recognize other refractory materials to meet their needs.

In operation, the concentrated solar energy 22 is received into the cavity 24 and heats the capacitors 28 of the heat exchanger 26. A working fluid is conveyed over the capacitors 28 through the flow passages 30 of the heat exchanger 26. The capacitors 28 exchange heat with the working fluid to increase the temperature of the working fluid. The packing factor of the capacitors 28 ensures that there is a sufficiently high surface area over the capacitors 28 to efficiently heat the working fluid. Further, the packing factor facilitates containment of the radiant thermal energy within the heat exchanger 26 by reducing the amount of open space that the radiant thermal energy can travel and thus escape.

The relatively high thermal capacity of the capacitors 28 also permits time-shifting between solar thermal collection and use. For example, the capacitors 28 can be "charged" with thermal energy when sunlight is available and store the thermal energy until a later time at which there is a demand to heat the working fluid.

Figure 6:
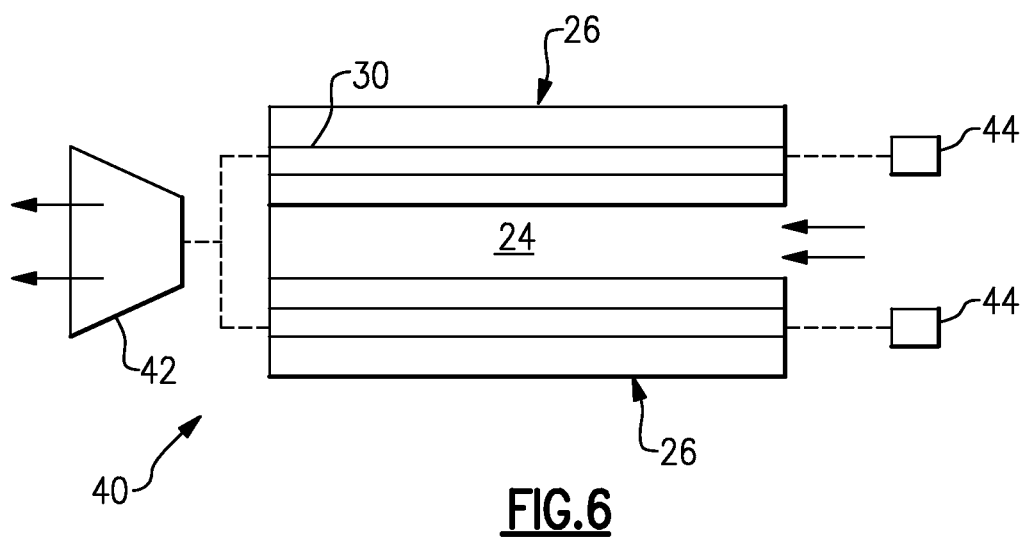
FIG. 6 shows a schematic view of a solar thermal propulsion device.

FIG. 6 shows an example solar thermal propulsion device 40 that utilizes the solar receiver 20. In this example, the solar thermal propulsion device 40 includes a thrust nozzle 42 in flow-receiving communication with the flow passages 30. The thrust nozzle 42 has a tapered shape that is operable to accelerate or direct flow of a working fluid, such as a propellant. In that regard, the flow passages 30 of the heat exchanger 26 are in communication with a propellant source 44 to receive propellant there from. The heat exchanger heats the propellant, which then expands through the thrust nozzle 42 to provide a propulsion force.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A solar receiver comprising:
a cavity operable to receive concentrated solar energy; and
a heat exchanger in thermal-receiving communication with the cavity,
the heat exchanger including a plurality of thermal capacitors,
wherein each of the plurality of thermal capacitors has a regular geometry,
wherein the plurality of thermal capacitors define open flow passages there between,
wherein each of the plurality of thermal capacitors are free of contact with each other,
wherein the open flow passages are linear parallel passages,
wherein at least two of the plurality of thermal capacitors have a different size, and
wherein the plurality of thermal capacitors has a packing factor of greater than 74% with regard to the volume of the heat exchanger.

2. The solar receiver as recited in claim 1, wherein the plurality of thermal capacitors includes cylindrical elements.

3. The solar receiver as recited in claim 1. wherein plurality of thermal capacitors includes substantially spherical elements.

4. The solar receiver as recited in claim 1, wherein the plurality of thermal capacitors includes first geometric thermal capacitor elements having a first size and second geometric thermal capacitor elements having a second, smaller size.

5. The solar receiver as recited in claim 4, wherein the first geometric thermal capacitor elements are free of contact with each other and each of the second geometric thermal capacitor elements is in contact with at least one other one of the second geometric thermal capacitor elements.

6. The solar receiver as recited in claim 4, wherein each of the second geometric thermal capacitor elements is in contact with at least two others of the first geometric thermal capacitor elements in a continuous network.

7. The solar receiver as recited in claim 4, wherein the second geometric thermal capacitor elements are arranged in a plurality of linear rows.

8. The solar receiver as recited in claim 7, wherein the plurality of linear rows arc parallel.

9. The solar receiver as recited in claim 4, wherein the first geometric thermal capacitor elements are arranged such that at least one of the first geometric thermal capacitor elements has six nearest neighboring ones of the first geometric thermal capacitor elements.

10. The solar receiver as recited in claim 1, wherein the heat exchanger extends circumferentially around the cavity.

11. The solar receiver as recited in claim 1, wherein the heat exchanger has an annular shape.

12. The solar receiver as recited in claim 1, wherein plurality of thermal capacitors include a refractory material selected from the group consisting of ceramic material, graphite material and combinations thereof.

13. A solar receiver comprising:
a cavity operable to receive concentrated solar energy; and
a heat exchanger in thermal-receiving communication with the cavity,
the heat exchanger including first geometric thermal capacitor elements and second geometric thermal capacitor elements defining flow passages there between,
wherein each of the plurality of first geometric thermal capacitors are free of contact with each other,
wherein the flow passages are linear parallel passages,
the first geometric thermal capacitor elements having a first size and the second geometric thermal capacitor elements having a second, different size.

14. The solar receiver as recited in claim 13, wherein the first geometric thermal capacitor elements and second geometric thermal capacitor elements include at least one of cylindrical elements and substantially spherical elements.

15. The solar receiver as recited in claim 13, wherein the first geometric thermal capacitor elements are free of contact with each other and each of the second geometric thermal capacitor elements is in contact with multiple other ones of the second geometric thermal capacitor elements.

16. The solar receiver as recited in claim 13, wherein each of the second geometric thermal capacitor elements is in contact with at least two of the first geometric thermal capacitor elements.

17. The solar receiver as recited in claim 13, wherein the heat exchanger has an annular shape.

18. A solar thermal propulsion device comprising:
a solar receiver including a cavity operable to receive concentrated solar energy and a heat exchanger in thermal-receiving communication with the cavity,
the heat exchanger including a plurality of thermal capacitors,
wherein each of the plurality of thermal capacitors has a regular geometry,
the plurality of thermal capacitors defining open flow passages there between,
wherein each of the quality of thermal capacitors are free of contact with each other,
wherein the open flow passages are linear parallel passages,
at least two of the plurality of thermal capacitors having a different size, and
the plurality of thermal capacitors has a packing factor of greater than 74% with regard to the volume of the heat exchanger; and
a thrust nozzle in flow-receiving communication with the flow passages.

19. The device as recited in claim 18, wherein heat exchanger has an annular shape.

20. The device as recited in claim 18, wherein the plurality of thermal capacitors includes at least one of cylindrical elements and substantially spherical elements.

* * * * *